United States Patent [19]
Smith

[11] Patent Number: 4,715,460
[45] Date of Patent: Dec. 29, 1987

[54] OMNIDIRECTIONAL VEHICLE BASE

[75] Inventor: Robert E. Smith, Cupertino, Calif.

[73] Assignee: International Texas Industries, Inc., San Antonio, Tex.

[21] Appl. No.: 673,965

[22] Filed: Nov. 20, 1984

[51] Int. Cl.$^4$ .............................................. B62D 61/00
[52] U.S. Cl. ..................................... 180/7.1; 180/210; 180/212; 301/5 P
[58] Field of Search .................. 180/7.1, 21, 212, 907, 180/210; 301/5 P, 5 R; 280/242 WC, 289 WC, 11.2, 11.2 J, 62, 11.19, 259; 305/19, 52; 16/22, 27, 29; 152/352 R, 310, 311, 323

[56] References Cited

U.S. PATENT DOCUMENTS

| | | | |
|---|---|---|---|
| 2,422,228 | 6/1947 | Ferrar | 280/11.19 |
| 2,430,037 | 11/1947 | Vincent | 280/11.2 |
| 2,603,301 | 7/1952 | Sipior et al. | 180/7.1 |
| 3,356,384 | 12/1967 | Dupeux | 280/62 |
| 3,789,947 | 2/1974 | Blumrich | 301/5 PX |

FOREIGN PATENT DOCUMENTS

| | | | |
|---|---|---|---|
| 475792 | 8/1951 | Canada | 280/47.11 |
| 2907272 | 8/1980 | Fed. Rep. of Germany | 180/7.1 |
| 902690 | 9/1945 | France | 280/11.19 |

*Primary Examiner*—John J. Love
*Assistant Examiner*—Mitchell J. Hill
*Attorney, Agent, or Firm*—Townsend and Townsend

[57] ABSTRACT

An omnidirectional wheelchair base 7 includes upper 10 and lower 20 flexible base plates held in spaced-apart alignment by a pair of front supports 14 and 16 and a rear support 18. A pair of front wheels 22 and 26 are provided, each mounted on the front supports 14 and 16, respectively, and each having an axis of rotation wherein the angle between the axes of rotations of each of the front wheels is less than 180°. A rear wheel is mounted on the rear support and has an axis of rotation less than 180° from each of the front wheels.

24 Claims, 7 Drawing Figures

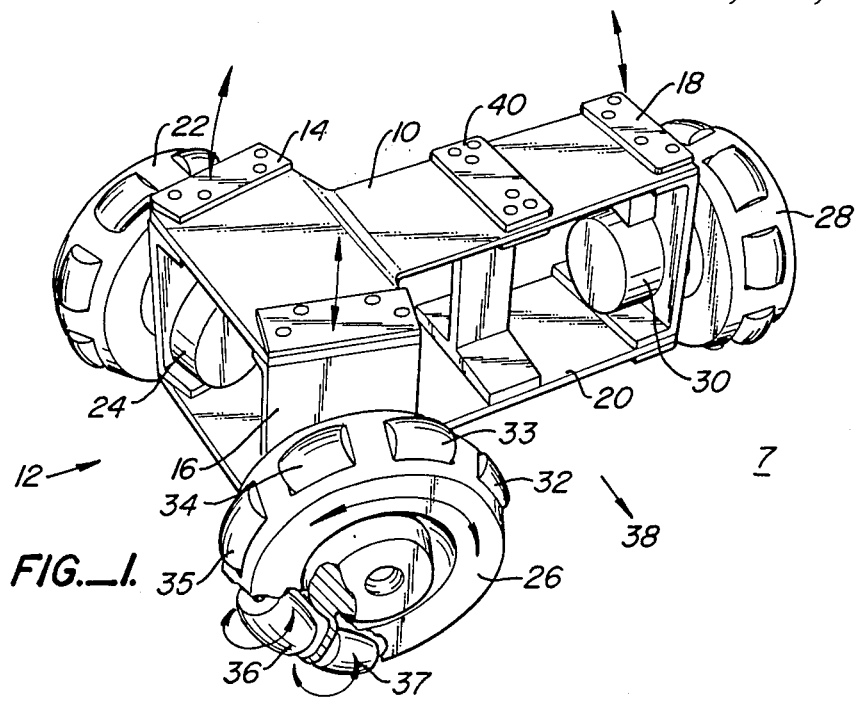
FIG._1.
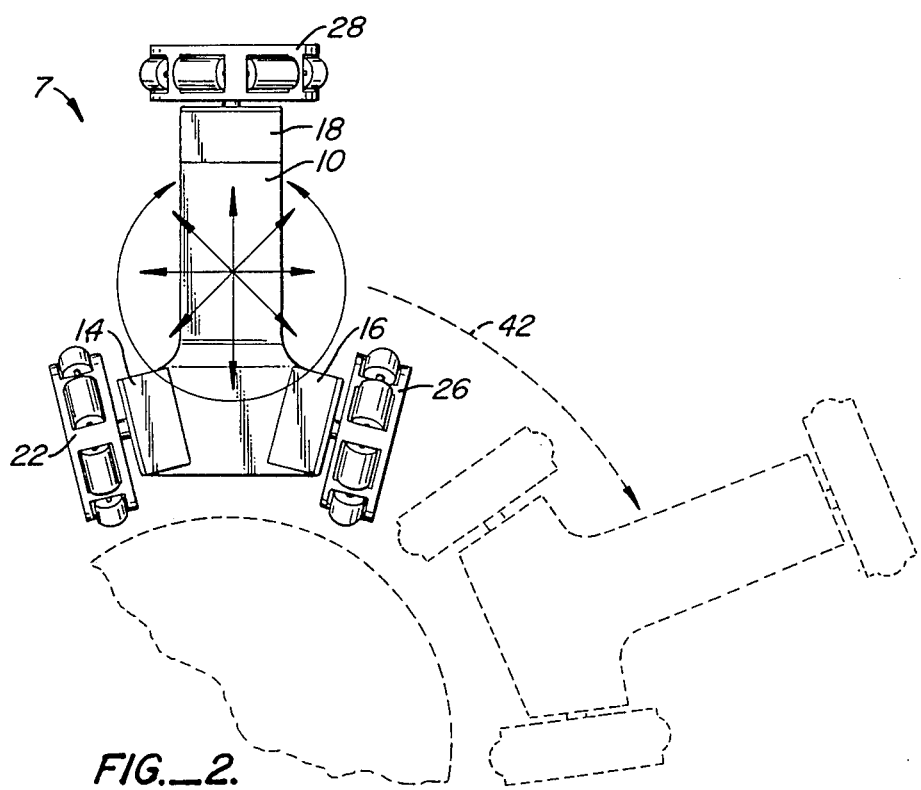
FIG._2.

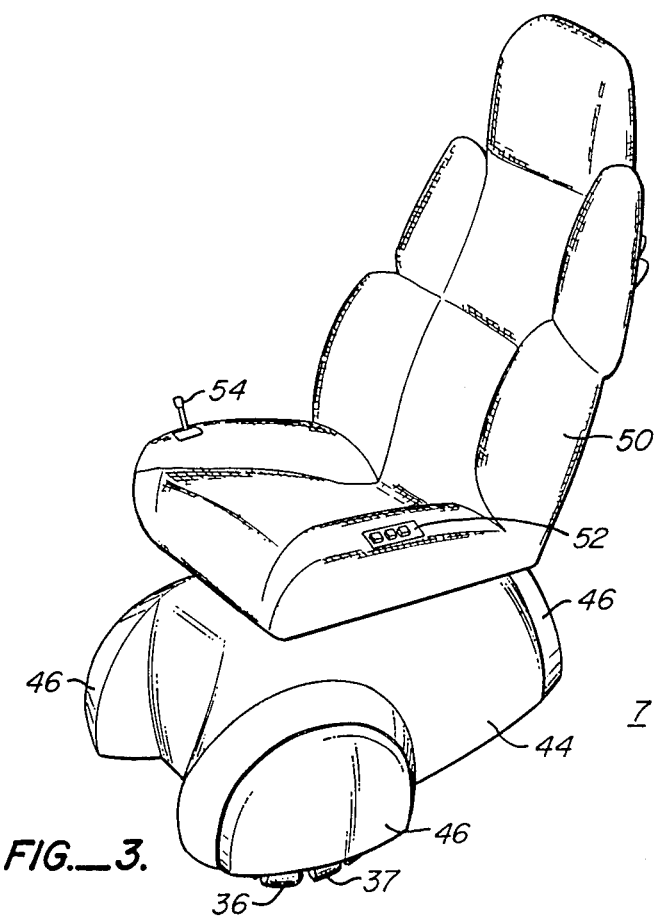
FIG._3.
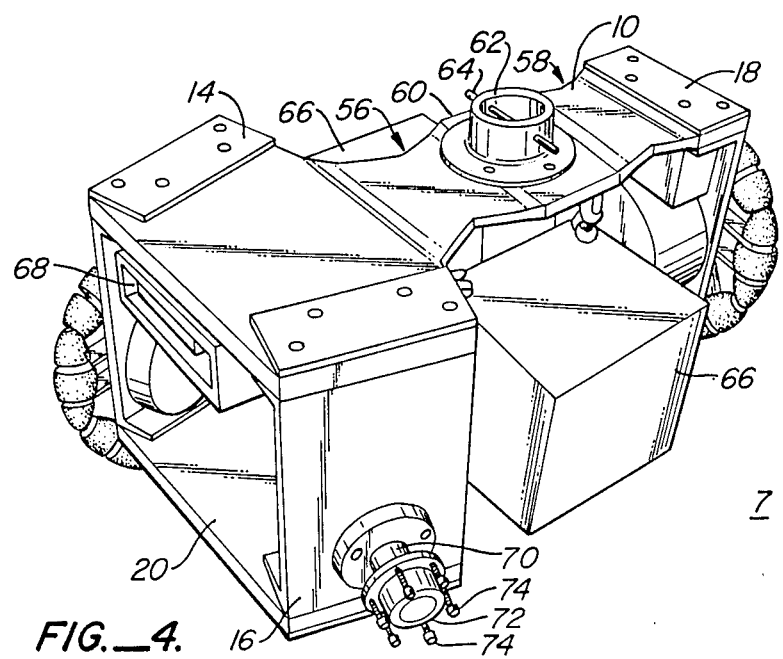
FIG._4.

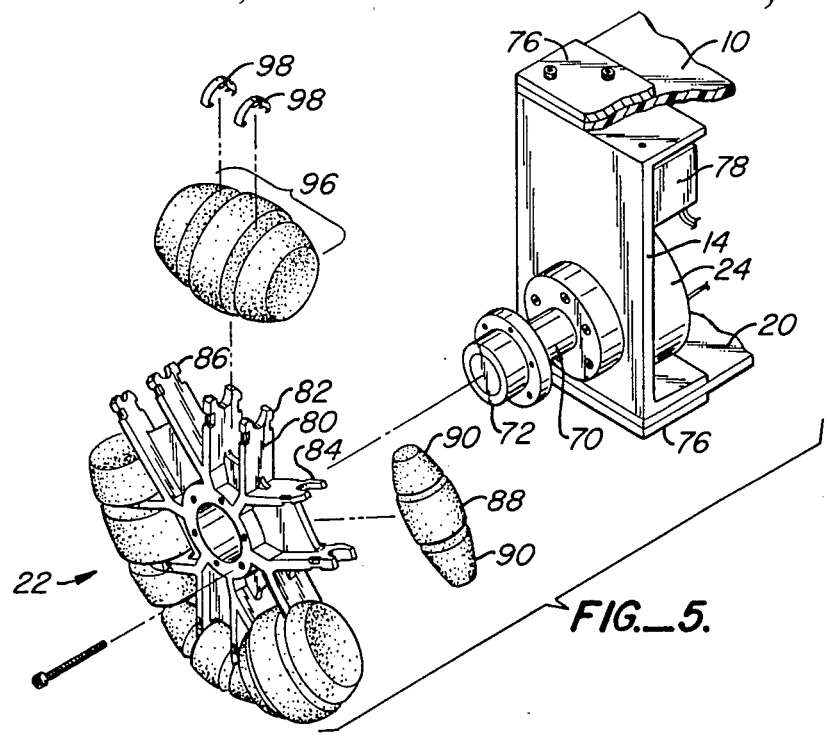
FIG._5.
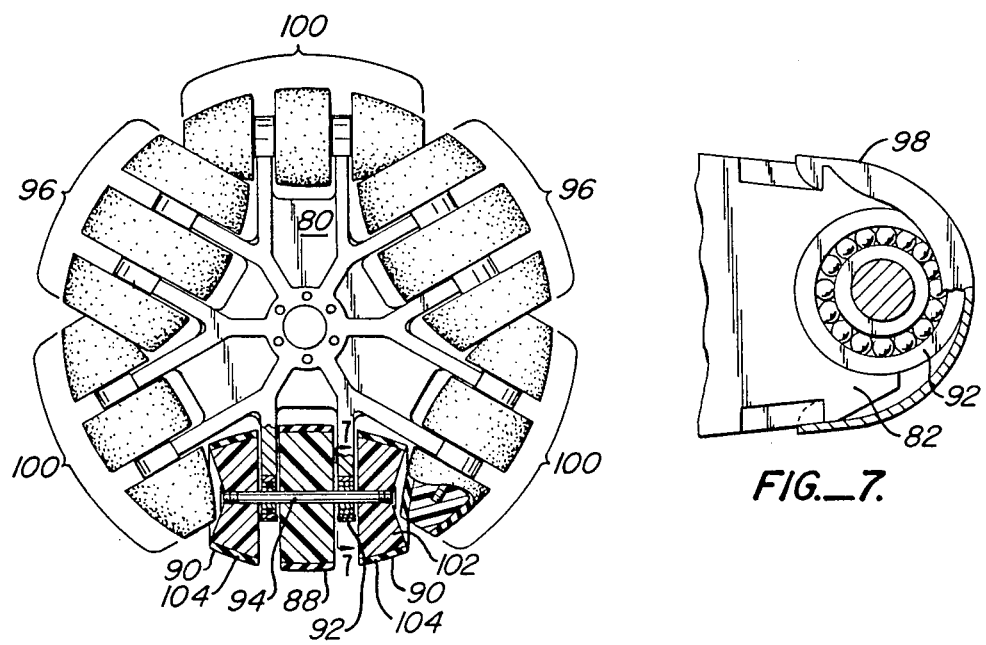
FIG._6.
FIG._7.

4,715,460

OMNIDIRECTIONAL VEHICLE BASE

BACKGROUND OF THE INVENTION

1. Field of the Invention

This invention relates to vehicles, and in particular, an omnidirectional wheelchair base in which the frame provides integral chassis suspension and support for the wheelchair.

2. Description of the Prior Art

Many types of omnidirectional vehicles are known in the art. For example, La in U.S. Pat. No. 4,237,990 describes an omnidirectional bumper car for amusement parks. Ziegler in U.S. Pat. No. 3,295,700 describes an omnidirectional vehicle for use in handling radioactive materials. Suitable wheels for such vehicles are described in U.S. Pat. No. 3,789,947 to Blumrich and U.S. Pat. No. 3,876,255 to Ilon.

These patents typify the prior approaches to omnidirectional vehicles in which size and weight were not significant factors in the design of the vehicle. The ride qualities of these prior art vehicles were determined mainly by the resiliency of the tires or wheels employed. The omnidirectional nature of the vehicle made provision of other suspension systems difficult. In addition, the cumbersome design of these prior art omnidirectional vehicles rendered them inapplicable to wheelchairs, in which all of the propulsion, suspension, and control must be situated in a relatively small area beneath the seat of a chair.

SUMMARY OF THE INVENTION

This invention provides an omnidirectional wheelchair base of highly compact design, and in which the suspension and chassis are integral. In a preferred embodiment of the invention, the wheelchair base includes upper and lower flexible base plates, typically fabricated from fiberglass-reinforced nylon. The upper and lower plates are separated by a pair of front supports and a single rear support which are used to maintain the plates in parallel alignment at a fixed separation. The axes of rotation of the front wheels, which are mounted on the front supports, are less than 180° apart, while the axis of rotation of the rear wheel is less than 180° from the axis of each of the front wheels. The planes of rotation of each wheel intersect to form a triangle.

In the preferred embodiment of the invention, a fourth support is provided to distribute loading equally between the upper and lower plates and to provide a mounting point for a chair and the battery power supply. By control of the shape and thickness of the upper and lower plates, the suspension qualities of the wheelchair may be controlled without need for cumbersome springs and shock absorbers or other suspension components.

Typically, each of the wheels includes a frame and a plurality of rollers disposed about the circumference of the wheel and attached to the frame. The axis of rotation of each roller corresponds to a chord of the circumference of the wheel on which it is mounted. By fabricating each roller in three parts and spacing the center portion from the end portions with bearings, the rollers may be preassembled and then attached to the frame using suitable apparatus. By displacing the axes of the front wheels 14.75° forward of a straight line perpendicular to the axis of the rear wheel, the cosine of the angle of the front wheel axis is 0.25, which simplifies digital processing of control information for driving the wheels.

BRIEF DESCRIPTION OF THE DRAWINGS

FIG. 1 is an perspective view of a simplified embodiment of the omnidirectional wheelchair base of this invention;

FIG. 2 is a top view of the structure of FIG. 1 illustrating the omnidirectional nature of the wheelchair base;

FIG. 3 is a perspective view of the base of the chair shown in FIG. 3 with cover removed;

FIG. 4 is a perspective view of the base of the chair shown in FIG. 3 with cover removed;

FIG. 5 is an exploded view of one wheel of the base illustrating its construction;

FIG. 6 is a side view of the wheel illustrating the construction of the rollers and their attachment to the wheel frame; and FIG. 7 is a cross-sectional view of the bearing and manner of attachment of it to the frame of the wheel.

DETAILED DESCRIPTION OF THE PREFERRED EMBODIMENT

FIG. 1 is a perspective view of a simplified version of the omnidirectional wheelchair base 7. The base shown includes an upper flexible base plate 10 and a lower flexible base plate 20. Each plate is generally T-shaped and of desired thickness to provide the requisite softness of suspension while also providing a chassis for the base. In the preferred embodiment each of the upper and lower plates are fiber-reinforced epoxy to provide high strength, low weight, and flexibility.

At the front 12 of the wheelchair base, a pair of front supports 14 and 16 maintain the upper and lower plates 10 and 20 at the desired parallel separation. A rear support 18 provides the same function at the rear of the base. Each of the supports provides a mounting for one of the wheels of the base. Front support 14 provides a mounting for wheel 22 and driving motor and gearbox 24, while front support 16 provides a mounting for wheel 26. The motor and gearbox which drive wheel 26 is concealed behind support 16 in FIG. 1. Finally, rear support 18 provides a mounting for wheel 28 and motor gearbox 30.

Disposed about the periphery of each wheel are a plurality of rollers. For example, disposed about the periphery of wheel 26 are rollers 32 through 37. Each of the other wheels includes similar rollers. The axes of rotation of the rollers correspond to chords of the circumference of the wheels. The rollers enable the omnidirectional base to move in directions other than the axis of rotation of the wheels. For example, if the base shown in FIG. 1 is to move directly forward or backward, motor gearbox 30 will not drive rear wheel 28, while the corresponding motors gearboxes for each of wheels 22 and 26 will drive those wheels at an equal speed in the same direction. In this manner back wheel 28 will roll along the ground in the direction of its axis of rotation by virtue of the rotation of the rollers around its periphery.

In a related manner, if the base is to be driven in the direction of arrow 38, each of wheels 22 and 26 will be driven clockwise (as viewed from the exterior side of the wheel), while wheel 28 will be driven counterclockwise. By driving wheels 22 and 26 at an angular rate sufficient to make the component of their rotation in the direction of arrow 38 equal to the angular rotation of wheel 28, the base will move in the direction of arrow 38. In a like manner, by driving each wheel at the appropriate angular rotation rate, the omnidirectional base can be caused to move in any direction.

The base shown in FIG. 1 also includes a fourth support 40 disposed between the upper and lower plates and between the front supports 14 and 16 and the rear support 18. Support 40 also functions to maintain the upper and lower plates 10 and 20 in a spaced-apart configuration, while providing a convenient attachment point for the chair portion of the wheelchair, as will be explained in conjunction with FIGS. 3 and 4.

FIG. 2 is a top view of the structure shown in FIG. 1 illustrating how, by driving each wheel at an appropriate rate, the omnidirectional base can be caused to follow a complicated path. As shown in FIG. 2, base 7 may be caused to follow a curved path, for example, to allow an individual seated at a circular table to move to an adjoining place. To achieve the path 42 shown, the rear wheel 28 is driven at a slightly greater angular rate than the sum of the velocity components of the front wheels in direction 42. Thus, the back of base 7 will move further than the front in a given amount of time causing the chair to traverse an arc.

FIG. 3 is a perspective view of base 7 after being enclosed in a cover 44. Other covers 46 are disposed over each of the wheels. Rollers 36 and 37 on wheel 26 are shown projecting from beneath cover 46. Covers 44 and 46 prevent an individual using the wheelchair from soiling their clothes or having them become entangled in the rotating wheels, while at the same time protect the motors and other equipment disposed between plates 10 and 20 from the environment. The cover may be a multi-piece configuration as here, or a single piece unit. As shown in FIG. 3 a chair 50 is mounted on base 7 on which the operator may sit. The chair includes controls 52 for controlling the height, back tilt, lumbar support, and other features of chair 50. Also mounted on the chair is a joystick 54 which through a suitable control system drives the wheels at necessary rates to move the chair in the desired direction.

FIG. 4 is a perspective view showing combination chassis and suspension system 7 in further detail. As may be understood therefrom, the planes of rotation of each wheel intersect to form a triangle. In the preferred embodiment the axis of rotation of the front wheels is 104.75° forward from the axis of rotation of the rear wheel. In this manner, the cosine of the angle of the front wheels with respect to a line perpendicular to the axis of rotation of the rear wheel is 0.25. This enables more convenient calculation of the necessary rotational rates of the wheels in a microprocessor-based control system.

As shown in FIG. 4 the upper plate 10 has been contoured by removal of material from regions 56 and 58 to adjust its stiffness. In addition, the central portion 60 of plate 10 is thicker than in the intervening region separating region 60 from the front 14 and 16 and rear 18 supports. A cylindrical tube 62 extends through the upper plate 10 and is connected to the lower plate 20 to couple the upper and lower plates together to distribute the loading of the vehicle between them and to provide a connection point for chair 50. In such an embodiment, chair 50 includes a flange on its lower surface to which a cylindrical pipe of smaller diameter than 62 is attached. A slot in the pipe attached to the bottom of chair 50 engages the pin 64 extending through tube 62 to angularly couple chair 50 to base 7 while still enabling removal of the chair for servicing of the base. Batteries 66 are shown mounted from tube 62 to provide a power supply for the motors which drive each wheel. By supporting the batteries from the tube 62, they are shock-isolated, thereby extending their lifetimes. A microprocessor-based control system 68 is suspended from top plate 10 to isolate it from vibration.

In FIG. 4, the left front wheel has been removed to show the axle 70, hub 72 and attachment bolts 74 by which the frame of each wheel is secured to the base 7. The bearing allows axle 70 to rotate in response to signals from the drive motor. The wheels shown in FIG. 4 are described in further detail in conjunction with FIGS. 5 and 6.

FIG. 5 is an exploded view of one wheel 22 illustrating the manner in which the wheel is constructed and secured to the base. As shown in FIG. 5 the motor gearbox 24 is coupled to support 14 to drive axle 70, thereby rotating hub 72 and wheel 22 attached thereto. The manner in which support 14 is attached to the upper and lower plates 10 and 20 is illustrated. In particular, rigid plates 76 are bolted to the upper and lower surfaces of flexible plates 10 and 20, respectively. The bolts extend through the flexible plates into the support 14. The power amplifier circuitry box 78 is also illustrated.

All three of the motor/gearboxes, their amplifiers and support members are identical. This simplifies manufacturing and servicing of the wheelchair by providing easier ascension to the economies of scale and a single component for a dealer or service bureau to stock. Furthermore, the supports provide a large, highly thermally conductive heat sinking surface for the power amplifiers, enabling them to run cooler and extending their service life. By including the amplifier on the motor mount/support, each motor assembly is a self-sufficient motive unit requiring only a power source and control signal.

Wheel 22 includes a frame 80, typically aluminum or glass-reinforced nylon. The frame includes a series of projecting members 82, 84, 86 which are adapted to receive bearings in the manner shown in detail in FIG. 7. Each roller includes three components, a central portion 88 and end portions 90 which are separated by bearings 92 (shown in FIG. 7). An axle 94 (shown in FIG. 6) extend through the two end portions 90 and central portion 88 of each roller as well as the bearings 92 to provide a completed assembly such as roller assembly 96. The frame/rollers are assembled by bringing the roller assembly 96 into position with respect to projecting frame members 82 and then employing clips 98 to secure the bearings in their proper position in the frame members.

FIG. 6 is a side view of wheel 22 illustrating the three large roller assemblies 96 and three smaller roller assemblies 100 coupled to frame 80 in each wheel. The lower roller assembly is shown in cross section to illustrate the central 88 and end portions 90, the axle 94 and bearings 92. Each portion of the roller includes a hub 102 typically comprised of glass-reinforced nylon, aluminum, or other desired material, and an exterior portion 104, typically of synthetic rubber, to provide traction.

The foregoing description of an omnidirectional vehicle base has been made with reference to specific embodiments. It should be understood that these embodiments are provided for purposes of explaining the invention, and are not intended to limit the invention. The invention will be applicable to other vehicles in which a compact integral chassis/suspension system is desired, for example, in materials handling, robots, etc. The scope of the invention may be ascertained from the appended claims.

I claim:

1. An vehicle base comprising:
   an upper flexible base plate;
   a lower flexible base plate;
   a pair of front supports and a rear support disposed between and attached to the upper and the lower base plates to maintain the plates at a fixed separation;
   a pair of front wheels each mounted on one of the front supports and having an axis of rotation, the angle between the respective axes of rotations of each of the front wheels being less than 180°; and
   a rear wheel mounted on the rear support and having an axis of rotation, the angle between the axis of rotation of the rear wheel and the axis of rotation of either front wheel being less than 180°.

2. Apparatus as in claim 1 wherein an additional support extends between the upper and lower plates and is disposed between the front supports and the rear support.

3. An omnidirectional vehicle base comprising:
   an upper base plate;
   a lower base plate;
   a pair of front supports and a rear support disposed between and attached to the upper and the lower base plates to maintain the plates at a fixed separation;
   a pair of front wheels each mounted on one of the front supports and having an axis of rotation, the angle between the respective axes of rotations of each of the front wheels being less than 180°;
   a rear wheel mounted on the rear support and having an axis of rotation, the angle between the axis of rotation of the rear wheel and the axis of rotation of either front wheel being less than 180°;
   wherein each of the front and rear wheels includes a frame and a plurality of rollers disposed about the circumference of the wheel and attached to the frame, each roller having an axis of rotation corresponding to a chord of the circumference of the wheel on which it is disposed.

4. Apparatus as claimed in claim 3 wherein the diameter of each roller varies from a first larger amount at the center of the length of the roller to a second smaller amount at each end of the roller to thereby provide each wheel with a substantially circular periphery.

5. Apparatus as in claim 3 wherein the upper base plate and lower base plates are flexible.

6. An omnidirectional vehicle base comprising:
   an upper baseplate;
   a lower baseplate;
   a pair of front supports and a rear support disposed between and attached to the upper and lower baseplates to maintain the plates at a fixed separation;
   a pair of front wheels, each mounted on one of the front supports and having an axis of rotation, the angle between the respective axes of rotations of each of the front wheels being less than 180°.
   a rear wheel mounted on the rear support and having an axis of rotation, the angle between the axis of rotation of the rear wheel and the axis of rotation of either front wheel being less than 180°; and
   wherein each of the front and rear wheels includes a frame and a plurality of rollers disposed about the circumference of the wheel and attached to the frame, each roller having an axis of rotation corresponding to a chord of the circumference of the wheel on which it is disposed, and each roller comprising:
   a central portion and two end portions, each end portion being spaced apart by a bearing from the central portion; and
   a roller axle extending through the center of each of the end and central portions and through the bearings;
   wherein the diameter of each roller varies from a first larger amount at the center of the length of the roller to a second smaller amount at each end of the roller for providing each wheel with a substantially circular periphery.

7. Apparatus as in claim 6 wherein each portion of each roller comprises:
   a hub through which the roller axle passes; and
   means coupled to the hub, for providing traction when the roller is in operable contact with a surface.

8. Apparatus as in claim 7 wherein the hub comprises glass reinforced nylon.

9. Apparatus as in claim 8 wherein the traction means comprises synthetic rubber.

10. Apparatus as in claim 6 wherein the frame of each wheel comprises a plurality of members projected from the axis of the wheel, each member being adapted to receive one of the bearings.

11. Apparatus as in claim 10 further comprising means for attaching an exterior surface of the bearing to the member.

12. A vehicle base comprising:
    an upper flexible base plate;
    a lower flexible base plate;
    a pair of front supports and a rear support disposed between and attached to the upper and the lower base plates to maintain the plates at a fixed separation;
    a rear wheel mounted on the rear support and having an axis of rotation; and
    a pair of front wheels each mounted on one of the front supports and having an axis of rotation, the angle between the respective axes of rotations of each of the front wheels being less than 180°, and the axis of each front wheel being approximately 104.75° forward from the axis of the rear wheel.

13. A wheel capable of revolution about an axis and translation along the axis comprising:
    hub means adapted to be rotatably coupled to the axis;
    a plurality of pairs of projecting members extending outwardly from the hub means, each pair of the members including means for receiving an axle;
    roller means disposed about each axle, each roller means including a central portion extending between the pair of members and two end portions disposed at opposite ends of the central portion, each end portion spaced from the central portion by one of the projecting members; and
    fastening means for securing each axle to a corresponding pair of members.

14. Apparatus as in claim 13 wherein the axle is disposed perpendicularly to the axis.

15. Apparatus as in claim 14 wherein the diameter of each roller varies from a first larger amount at the center of the central portion of the roller to a second smaller amount at each end of the roller, to thereby provide each wheel with a substantially circular periphery.

16. Apparatus as in claim 15 wherein each roller has an axis of rotation corresponding to a chord of the substantially circular periphery of the wheel.

17. Apparatus as in claim 13 wherein each member includes means for receiving a bearing and the axle is supportably mounted by each bearing.

18. Apparatus as in claim 13 wherein each roller means comprises a rigid roller hub surrounded by flexible material.

19. A vehicle base comprising:
an upper flexible baseplate;
a lower flexible baseplate;
a pair of front supports and a rear support disposed between and attached to the upper and the lower baseplates to maintain the plates at a fixed separation;
an additional support extending between the upper and lower base plates and disposed between the front supports and rear support, the additional support extending above the upper baseplate and including means for receiving a base of a chair;
a pair of front wheels each mounted on one of the front supports and having an axis of rotation, the angle between the respective axes of rotations of each of the front wheels being less than 180°; and
a rear wheel mounted on the rear support and having an axis of rotation, the angle between the axis of rotation of the rear wheel and the axis of rotation of either front wheel being less than 180°.

20. A wheel capable of revolution about an axis and translation along the axis comprising:
hub means adapted to be rotatably coupled to the axis;
a plurality of pairs of projecting members extending outwardly from the hub means, each projecting member including a recess at the end thereof contoured to receive the exterior surface of a bearing;
an axle supportably mounted by each bearing;
roller means disposed about each axle, each roller means including a central portion extending between the pair of members and two end portions disposed at opposite ends of the central portion, each end portion being spaced from the central portion by one of the projecting members; and
fastening means for securing each axle to a corresponding pair of members.

21. Apparatus as in claim 20 wherein the fastening means comprises a clip adapted to fit over an exterior surface of the bearing and couple it to the member.

22. A vehicle base comprising:
an upper flexible baseplate;
a lower flexible baseplate;
a pair of front supports and a rear support disposed between and attached to the upper and the lower baseplates to maintain the plates at a fixed separation;
a pair of front wheels each mounted on one of the front supports and having an axis of rotation, the angle between the respective axes of rotation of each of the front wheels being less than 180°; and
a rear wheel mounted on the rear support and having an axis of rotation, the angle between the axis of rotation of the rear wheel and the axis of rotation of either front wheel being less than 180°;
wherein each front wheel and the rear wheel have a plane of rotation perpendicular to its respective axis of rotation, the planes of rotation of the wheels intersecting to form a triangle.

23. A wheel capable of revolution about an axis and translation along the axis comprising:
a hub;
a plurality of pairs of projecting members extending outwardly from the hub, each pair of members including means for receiving an axle;
a plurality of first rollers each disposed about an associated axle, each roller including a central portion extending between a pair of members and two end portions each having opposite sides and being disposed at opposite ends of the central portion, one side of each end portion being spaced from the central portion by one of the projecting members and the other side of each end portion having a concave surface facing away from the central portion and defining a concave region;
a plurality of second rollers each disposed about an associated axle, each roller including a central portion having a diameter smaller than a diameter of the central portion of a first roller and two end portions disposed at opposite ends of the central portion, each end portion having a diameter smaller than a diameter of an end portion of a first roller, and each end portion being spaced from the central portion by one of the projecting members;
fastening means for securing each axle to a corresponding pair of members; and
wherein the first rollers alternate with the second rollers about the circumference of the wheel.

24. A wheel as in claim 23 wherein the end portion of a second roller projects into the concave region of the adjacent first roller end portion.

* * * * *